United States Patent [19]

Leeland

[11] Patent Number: 4,872,133

[45] Date of Patent: Oct. 3, 1989

[54] FLOATING-POINT SYSTOLIC ARRAY INCLUDING SERIAL PROCESSORS

[75] Inventor: Steven B. Leeland, Phoenix, Ariz.

[73] Assignee: Motorola, Inc., Schaumburg, Ill.

[21] Appl. No.: 157,682

[22] Filed: Feb. 18, 1988

[51] Int. Cl.$^4$ .............................................. G06F 7/48
[52] U.S. Cl. ................................................. 364/748
[58] Field of Search ................................ 364/748, 736

[56] References Cited

U.S. PATENT DOCUMENTS 3,701,976 10/1972 Shively ................................ 364/748
4,751,665 6/1988 Cappello et al. ................... 364/748

OTHER PUBLICATIONS

Blackmer et al., "A 200 MOPS Systolic Processor", SPIE Conf. Proceeding, vol. 298, Real Time Signal Processing IV, Aug. 81, p. 9.

Primary Examiner—David H. Malzahn
Attorney, Agent, or Firm—Frank J. Bogacz

[57] ABSTRACT

A systolic array including chips having interface and timing and control circuitry and a plurality of processing elements. Each of the processing elements includes a floating-point serial processor and a plurality of data storage registers. The data storage registers in all of the elements communicate through a gridwork of data buses and all data registers and processing elements are programmed through a global bus. Software is simplified because algorithms are implemented directly in the new architecture.

11 Claims, 3 Drawing Sheets

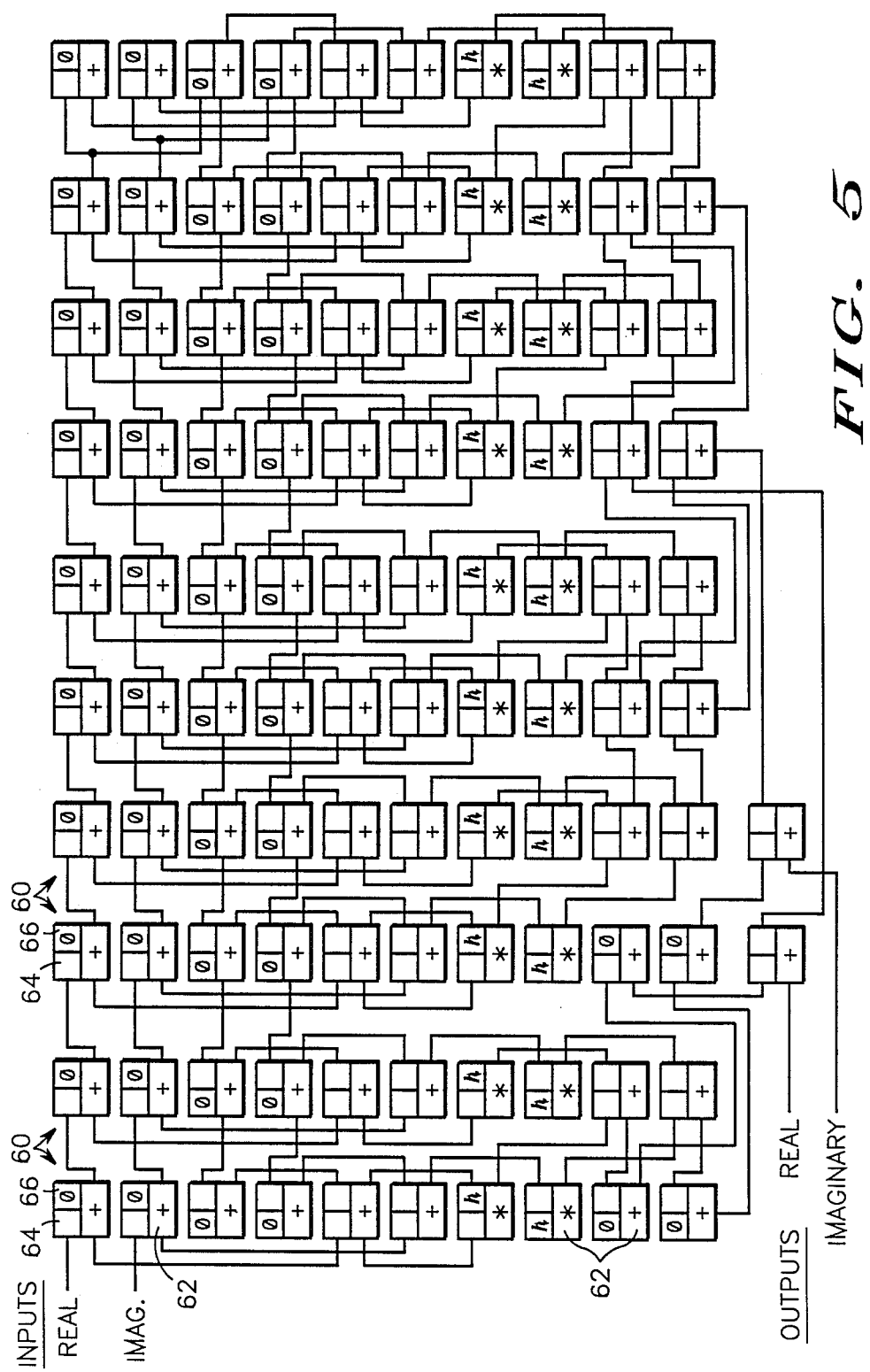

FLOATING-POINT SYSTOLIC ARRAY INCLUDING SERIAL PROCESSORS

BACKGROUND OF THE INVENTION

The present invention pertains to digital signal processors and more particularly to floating-point systolic arrays including digital signal processors.

The basic systolic structure is a two-dimensional array of processing elements in which each processor communicates directly with its nearest neighbors. This structure performs well on algorithms with strong locality of signal flow. There are at least two forms of systolic array architectures. One form has relatively fewer processing elements, and each processing element is individually programmable. This can make software development difficult. Another form has every processing element performing the exact same operation on its local data. The entire array is programmed simultaneously. This offers the advantage of reduced software development. However, it complicates data-based decision branching since each element is operating on different data.

A prior art systolic array chip, identified by the number NC45CG72 is commercially available from NEC Corp. of Japan. The NC45CG72 systolic array is based on a 6 by 12 array of 1 bit processing elements. Each processing element contains a full add/subtract ALU and a 128 bit RAM. Also, the 72 element chips are cascadable into larger arrays. A 32 bit floating-point benchmark written for this chip indicates an execution time of 171 microseconds.

SUMMARY OF THE INVENTION

It is an object of this invention to provide a new and improved systolic array processing element including a serial floating-point processor.

It is a further object of this invention to provide a new and improved systolic array with processing elements including serial floating-point processors which is substantially faster than prior art arrays.

It is a further object of this invention to provide a new and improved systolic array with processing elements including serial floating-point processors which is substantially simpler to program.

It is yet another object of this invention to provide a new and improved processor element which improves communications between elements.

It is a further object of this invention to provide new and improved chip architecture for a systolic array.

These and other objects are realized in a systolic array system utilizing a plurality of semiconductor chips, wherein a semiconductor chip includes a plurality of processing elements each having a floating-point serial processor and a plurality of data storage registers; global bus means coupled to the serial processor of each of the plurality of processing elements for inputing and outputing data to and from each chip and for programming each serial processor; a plurality of data buses coupled to each of the plurality of data storage registers of each of the plurality of processing elements; and the global bus means being coupled to the plurality of data storage registers for programming the data storage registers.

BRIEF DESCRIPTION OF THE DRAWINGS

Referring to the drawings:

FIG. 5 illustrates an equivalent operation to the algorithm of FIG. 4 in systolic array notation.

DESCRIPTION OF THE PREFERRED EMBODIMENT

A primary purpose for the present systolic array is to perform general voice-grade digital demodulation algorithms at 16 times real time. The systolic array must also perform 32-bit floating-point arithmetic. Currently, systolic arrays require two microcoded digital signal processing boards to operate at real time. The new systolic array achieves a processing performance factor of approximately 40 over the current arrays.

Figure 1:
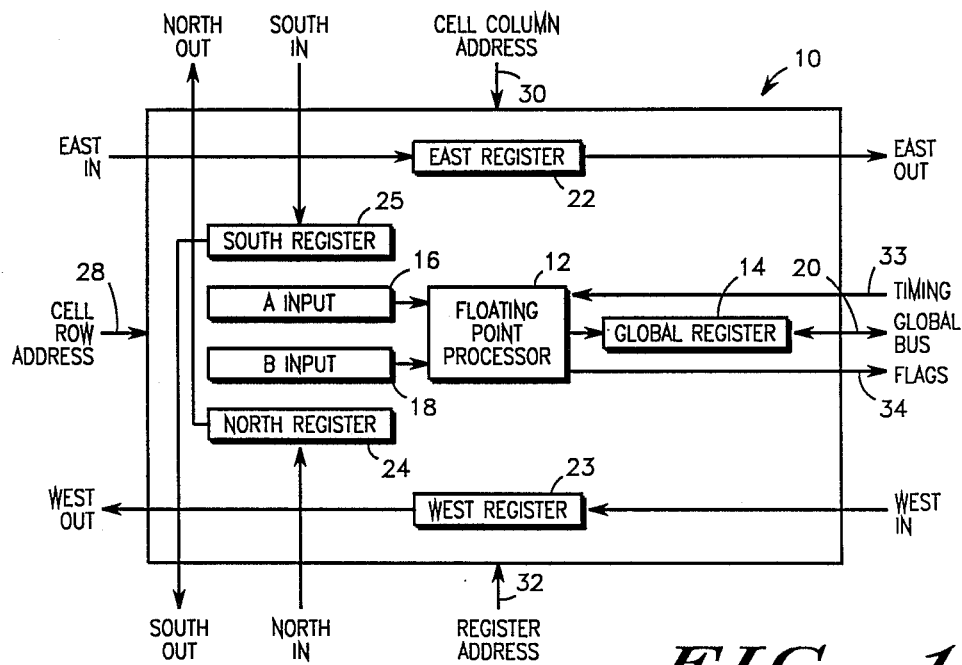
FIG. 1 is a simplified block diagram of a processing element embodying the invention.

The processing element structure for the new systolic array is illustrated in FIG. 1. A processing element 10 includes a 32-bit floating-point serial processor 12 having a global bus register 14 and A and B input registers 16 and 18, respectively, associated therewith. Global bus register 14 is coupled to an inter-element global bus 20 and is used for programming serial processor 12. Processing element 10 also includes east, west, north and south data storage registers 22 through 25, respectively. Each data storage register 22–25 is coupled into an associated inter-element data bus. Element 10 is addressed by row and column signals on inputs 28 and 30, respectively. A register address bus 32 addresses individual registers within element 10 during initialization. All registers within element 10 are initialized from inter-element global bus 20. Data storage registers 22–25 are initialized to select their input data from any other bus during any clock cycle of the processing cycle. Input registers 16 and 18 are initialized to receive their data from either any data bus or inter-element global bus 20 during any clock cycle of the processing cycle. Registers 16 and 18 are programmed to either tap off information from one of the data storage registers 22–25 at a particular time during the processing cycle or to receive information from inter-element global bus 20 at a specific time slot during a process cycle. Data for serial processor 12 is input from registers 16 and 18. At the end of a processing cycle, the results are stored in data storage registers 22–25 and also in global register 14 from which it fans out to other processing cycles in other serial processors.

Floating-point serial processor 12 is also initialized from inter-element global bus 20. Serial processor 12 receives timing information from chip interface and timing control circuitry, which will be described presently, on timing input 33. Serial processor 12 can be initialized to perform one of four floating-point operations: Multiplication, addition/subtraction, floating-point to fractional-fixed transformation, and fractional-fixed to floating-point transformation. Each input can also be absolute valued, changed in sign, or have one of two relative operations performed. These can be used simultaneously to perform the negative of the absolute value if desired. No division operation is provided for; however, it is possible to program the equivalent operation into the array. The fixed and floating-point conversions have two purposes. They are used for input and output of analog data.

They are also used for output of addresses for coefficient lookup RAMs, to be described presently. The fractional format allows increasing system performance by adding hardware to use more available significant bits without changing the algorithms. The relative input operations allow performing analog switch functions and Boolean operations. A positive function (GE) converts positive inputs into a floating-point one (1.0) and negative inputs into a floating-point zero (0.0). A negative function (LT) performs the opposite conversion.

Each floating-point operation is protected from the effect of underflow and overflow. These events are replaced with properly limited results. Underflows result in zero (0.0) and overflows result in properly signed maximum values representable. These events are also flagged, on output 34, and are provided as outputs for interrupting some controlling processor if desired. In addition, the events are latched at the offending processing element and are readable over inter-element global bus 20. This allows the offending processing element to be tracked down during processing if necessary. Only the global bus can reset the flag latches once they are set.

Figure 2:
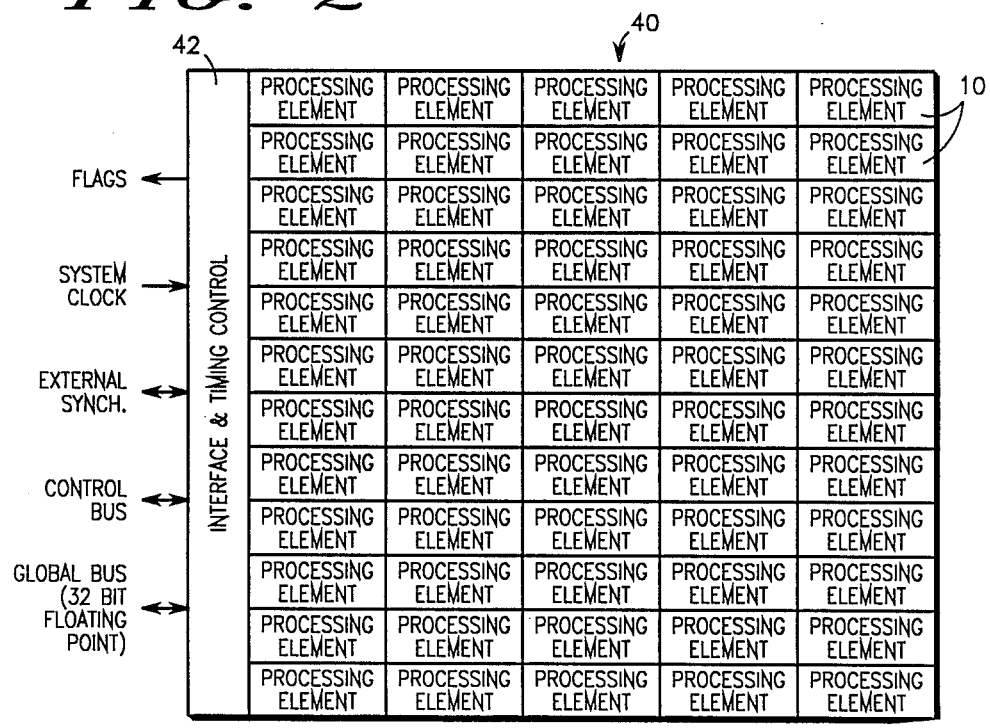
FIG. 2 illustrates chip architecture for a systolic array semiconductor chip incorporating a plurality of processing elements as illustrated in FIG. 1.
Figure 3:
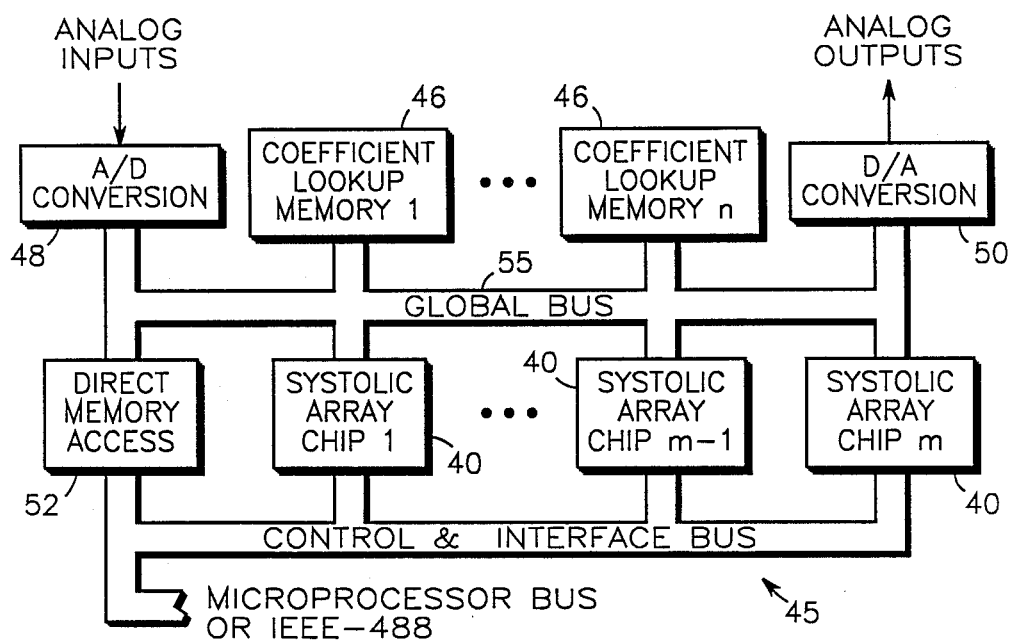
FIG. 3 illustrates a typical systolic array system configuration utilizing semiconductor chips as illustrated in FIG. 2.

The basic chip architecture is shown in FIG. 2. A semiconductor chip 40 consists primarily of an array (in this embodiment 60) of processing elements 10 and interface and timing control circuitry 42. The external interfaces are not pin intensive and require only a 64-pin package. This eliminates the need for a grid array package and its associated socket problems. It is also possible to make the control bus pin selectable between a 68000 bus or an IEEE 488 interface, as illustrated in FIG. 3. A very useful feature is that the processing cycles can be synchronized to start on external events such as real time A/D data, or it is possible to single step processing cycles via the control bus, or chip 40 can be set to process continuously.

One embodiment of a systolic array system 45 is illustrated in FIG. 3. Systolic array system 45 consists of a plurality of systolic array chips 40, coefficient lookup RAMs 46, A/D conversion circuitry 48, D/A conversion circuitry 50, and direct memory access circuitry 52. Lookup RAMs 46 are loaded at system initialization with floating-point constants and difficult to implement functions such as transcendentals and trigonometrics. System 45 can be used in two scenarios. One is the real-time system with analog input and output. The real-time system synchronizes the processing cycles to the sample rate. Another system would act as an array processor board for a host computer. This system processes files of data through channels of direct memory access circuitry 52.

The most critical factor in systolic array architecture is the size of a single processing element. Small processing elements allow more elements to be incorporated in each semiconductor chip which, in turn, reduces overall system size. This is very desireable. In order to accomplish this, the new systolic array architecture has, as the heart of processing element 10, 32-bit, floating-point serial processor 12. Serial processor 12 requires an order of magnitude less logic than a parallel version. Because processor 12 is serial it requires 50 clock cycles to perform any floating-point operations. However, it is possible to operate chip 40 at 20 MHz since the longest path is an 8-bit exponent adder (not shown). This means the processing cycles are 2.5 microseconds long. A new data sample is introduced into array 45 every 2.5 microseconds. There is a single clock cycle delay between processing cycles to allow nearest neighbor processing elements 10 to communicate with no delays.

Because the floating-point processing consumes 50 clock cycles, it is possible to improve the intercell communications. During these otherwise unusable times, data is allowed to flow through processing elements 10 transparently. The network of east, west, north, and south buses allow data to travel as far as 50 cells away during one processing operation. In addition, it is possible to transfer data from one bus to another through proper initialization. Such a transfer displaces some particular piece of data, but it also allows nearly any processing element 10 to communicate to any other processing element 10 within a 50-cell radius. On top of this data bus network is inter-element global bus 20 which communicates to every processing element 10 within each chip 40. Inter-element global bus 20 has 50 time slots in which previously identified processing elements 10 either send or receive. Another more important function of inter-element global bus 20 is its external attribute. It can transport data on and off chip 40. The inter-element global bus 20 on each chip 40 are interconnected by array global bus 55. Global bus 55 is used to connect with other systolic array chips 40, A/D conversion circuitry 48, D/A conversion circuitry 50, coefficient lookup RAMs 46, and direct memory access circuitry 52. This architecture has versatility since elements 10 are reinitialized during powerup. Thus, the same elements 10 can always perform new functions.

Figure 4:
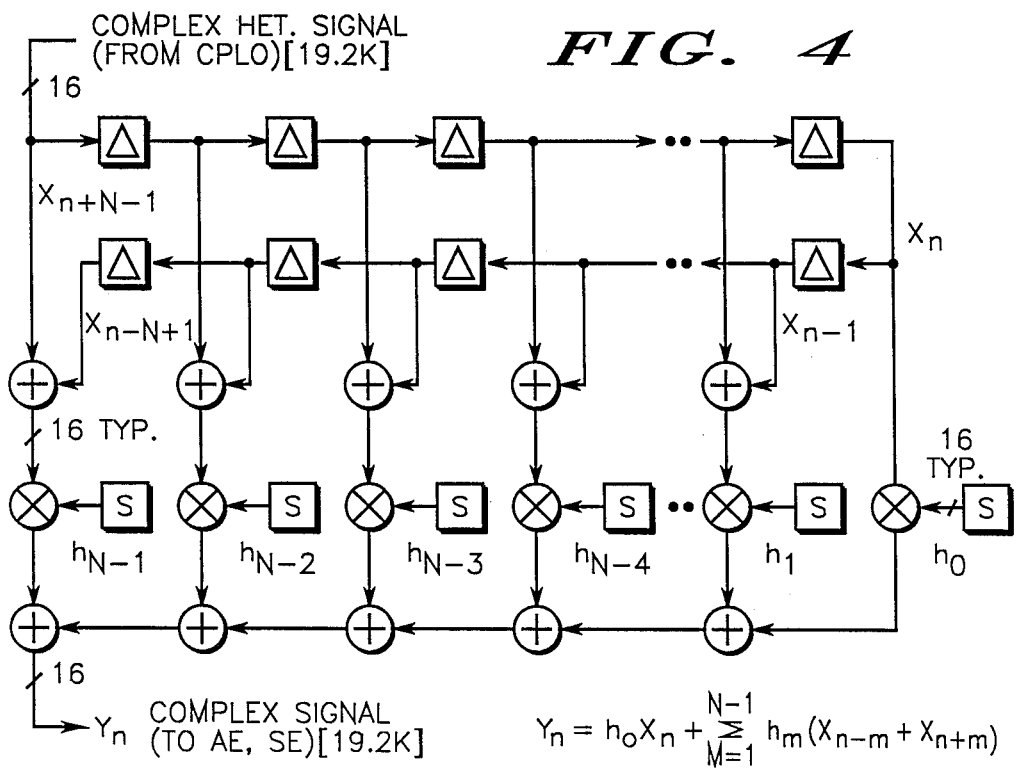
FIG. 4 illustrates a PASCAL simulation of a real to complex filter algorithm.

To illustrate its efficiency of operation and programming, systolic array 45 was programmed to perform a general voice grade digital demodulation algorithm. The algorithm utilized is a real to complex filter. FIG. 4 illustrates a PASCAL simulation of the algorithm. Since the delay line, addition, and multiplication notations are well known to those skilled in the art, no detailed explanation of this simulation is believed necessary.

The equivalent operation is illustrated in a systolic array notation in FIG. 5. Each large square 60 represents a single processing element 10. A large bottom section 62 of each square 60 identifies the programmed operation of the cell (*, +, fix, or float). Two top sections 64 and 66 of each square 60 represent the input functions for processing element 10. A constant number here indicates that the input register is initialized to this value and is not changed throughout the algorithm. Signal lines flow from output sections (bottom sections) to input sections (top sections) of other processing elements. Only adjacent cells incur no delay between processing cycles. All other transfers incur a single processing cycle delay. The top four rows of squares 60 perform as the delay line of the algorithm with add zero (0.0) functions. At the top right (last square 60 in the top two rows) where the signal is turned back onto the next two rows, the signal is taken from the previous tap to eliminate the effect of delay from going directly top to bottom. The next two rows (fifth and sixth from the top) sum the outputs from the taps together. The next two rows (seventh and eighth from the top) multiply by the real constant "h" coefficients. The final two rows perform a summation in a "piped" tree fashion. This results in a 6 sample transport delay but it also does perform the correct results. The illustrated systolic array operation performs the real to complex filter algorithm with results that are fully comparable to the PASCAL simulation.

The architecture of processing element 10 and chip 40 greatly reduce the amount of software development necessary to implement various digital signal processing algorithms. The basic concept for a software development tool is a spreadsheet processor. The algorithm is simply entered, copied, and replicated just as in any spreadsheet tool. Then as an added feature the new algorithm is tested, simulated, and debugged with the same tool. This tool takes into account the partitioning of processing elements 10 into individual systolic array chips 40 and is easily reconfigured for newer chips. The tool provides single-step processing as well as processing until previously entered breakpoint conditions are satisfied. These breakpoint conditions include the ability to break when any range of processing elements have data values within any numerical range. A certain number of breakpoint conditions are logically combined and counters used to delay breakpoint conditions. These values are stored and retrieved for later use. Global system inputs and outputs are directed to and from specified data files. Coefficient lookup RAMs are simulated and loaded from files, saved into files, displayable, and modifiable. All result files are plotted on graphics terminals and printed on graphics printers. In addition, fast fourier transforms are performed on these data files. The configuration output of the tool enters into a translator that determines the exact code to program into the real systolic array 45. This translator automatically determines the bus traffic switching.

Since it is possible to read and write into each cell in systolic array 45, testing is simplified. Test routines are only developed for a single processing element 10 and then used to simply test each individual processing element in systolic array 45.

The new systolic array architecture and processing element solve several classical problems. They achieve the processing performance goal and also relieve the data communication problem by allowing data to be passed directly between any processing elements. These transfers occur within a single processing cycle delay. Most importantly, the new architecture and processing element greatly reduce software development efforts since algorithms are implemented directly in the new systolic array architecture.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. In a systolic array system utilizing a plurality of semiconductor chips, a semiconductor chip comprising:
   a plurality of processing elements each including a floating-point serial processor and a plurality of data storage registers;
   global bus means coupled to the serial processor of each of said plurality of processing elements for inputing and outputing data to and from each chip and for programming each serial processor;
   a plurality of data buses coupled to each of the plurality of data storage registers of each of said plurality of processing elements; and
   said global bus means being coupled to said plurality of data storage registers for programming said data storage registers.

2. In a systolic array system utilizing a plurality of semiconductor chips, a semiconductor chip comprising:
   a plurality of processing elements each including a floating point serial processor with timing input, at least one data input register coupled to said processor, and a programming register with input/output couples to said processor, each element including in addition a plurality of data storage registers each having a data bus input and data bus output;
   interface and timing control means having control bus, timing control bus and global bus connections;
   timing control bus means coupled to said timing control bus connection of said interface and timing control means and to the floating point processor in each of said plurality of processing elements;
   global bus means coupled to said global bus connections of the interface and timing control means and to the programming register of each of said plurality of processing elements for inputting and outputting data to and from each chip and for programming each serial processor;
   register address bus means coupled to each of the data storage registers and to said global bus means for addressing each data storage register within each of said plurality of processing elements during programming; and
   a plurality of data buses coupled to each of the plurality of data storage registers of each of said plurality of processing elements.

3. In a systolic array system having a plurality of semiconductor chips, a semiconductor chip as claimed in claim 2 wherein the plurality of processing elements and the global bus means are constructed to operate at a 32 bit level and approximately 20 megahertz.

4. In a systolic array system having a plurality of semiconductor chips, a semiconductor chip as claimed in claim 2 wherein the plurality of data storage registers includes at least four registers, with each register being coupled to a data storage register of an adjacent processing element by the plurality of data buses.

5. A method of performing systolic array systems operations including the steps of:
   providing a plurality of processing elements each including a floating-point serial processor and a plurality of; data storage registers coupled by a plurality of data buses to said serial processor;
   performing programmed processes in each of said serial processors utilizing a plurality of clock cycles.
   transferring data through the plurality of data buses to selected data stroage registers of said plurality of data storage registers during the programmed processes with each of the clock cycles, up to a maximum number approximately equal to the plurality of clock cycles; and
   transferring data to selected serial processors after completion of each of the programmed processes utilizing an additional clock cycle.

6. A method of performing systolic array systems operations as claimed in claim 5 wherein the plurality of clock cycles utilized is up to approximately 50.

7. A method of performing systolic array systems operations as claimed in claim 5 including the steps of providing a global bus coupled to each of the plurality of processing elements, and utilizing the global bus for programming the processes into each of said serial processors.

8. A method of performing systolic array systems operations as claimed in claim 7 including the step of coupling the global bus to each of the data storage registers and utilizing the global bus for programming each of said data storage registers.

9. A systolic array comprising:
a plurality of semiconductor chips, each of said chips including a plurality of processing elements each including a floating-point serial processor and a plurality of data storage registers;
global bus means coupled to the serial processor of each of said plurality of processing elements for inputing and outputing data to and from each chip and for programming each serial processor;
a plurality of data buses coupled to each of the plurality of data storage registers of each of said plurality of processing elements; and
said global bus means being coupled to said plurality of data storage registers for programming said data storage registers;
an inter-chip global bus coupled to the global bus means of each of said plurality of semiconductor chips;
analog to digital conversion means coupled to said inter-chip global bus and to an analog input for providing digital signals to said inter-chip global bus in response to the application of analog signals to the analog input; and
digital to analog conversion means coupled to said inter-chip global bus and to an analog output for converting digital signals to analog signals and providing them at the analog output.

10. A systolic array as claimed in claim 9 including in addition at least one coefficient lookup memory coupled to the inter-chip global bus.

11. A systolic array as claimed in claim 9 wherein each of the semiconductor chips further includes interface and timing control means coupled to each of the processing elements and the array further includes a control and interface bus coupled to the interface and timing control means on each chip.

* * * * *